Aug. 22, 1933. J. A. WHITTINGTON 1,923,468
AUXILIARY TEMPERATURE REGULATOR FOR THERMOSTATICALLY
CONTROLLED GAS FIRED REFRIGERATORS
Filed Sept. 5, 1929
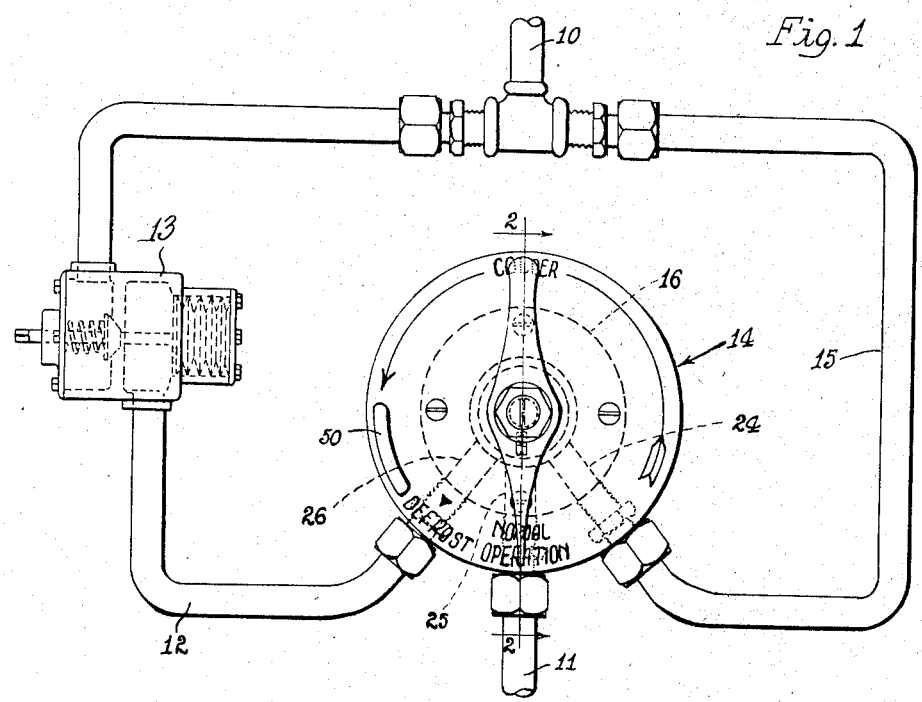
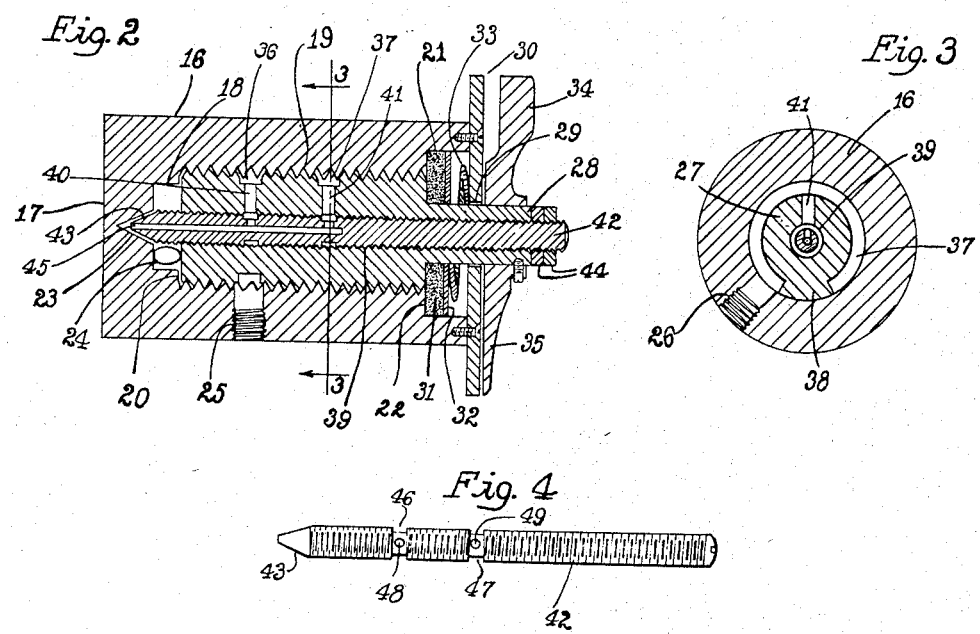
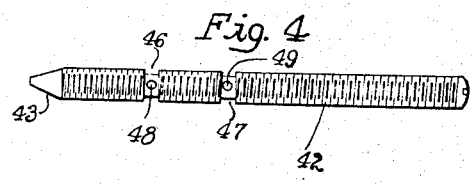
Inventor:
James A. Whittington,
Attys.

Patented Aug. 22, 1933

1,923,468

UNITED STATES PATENT OFFICE 1,923,468

AUXILIARY TEMPERATURE REGULATOR FOR THERMOSTATICALLY CONTROLLED GAS-FIRED REFRIGERATORS

James A. Whittington, Chicago, Ill., assignor to The Peoples Gas Light and Coke Company, Chicago, Ill., a Corporation of Illinois Application September 5, 1929. Serial No. 390,506

12 Claims. (Cl. 62—5)

The present invention relates to a new and improved auxiliary temperature regulator for thermostatically controlled gas-fired refrigerators.

The primary object of the present invention resides in the provision of a regulator of the foregoing character which is operable independently of the thermostatic control to vary the supply of gas, as for example to a minimum for defrosting purposes, or to a maximum for effecting rapid cooling.

Another object is to provide a novel regulator of the foregoing character which is simple, compact and inexpensive in construction, and which can be readily adjusted and manipulated.

Further objects and advantages will become apparent as the description proceeds.

In the accompanying drawing,

Figure 1 is a fragmentary representation of a refrigerator embodying the features of my invention.

Fig. 2 is an axial sectional view of the regulator taken along line 2—2 of Fig. 1.

Fig. 3 is a transverse sectional view of the regulator taken along line 3—3 of Fig. 2.

Fig. 4 is an elevational view of the adjusting needle.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the refrigerator in which the regulator constituting the exemplary embodiment of the invention is embodied, comprises a gas pipe 10 leading to a burner (not shown) and adapted to receive gas from a supply pipe 11 through an intermediate pipe 12. Interposed in the pipe 12 is a thermostatically controlled valve 13 normally operable to control automatically the supply of gas to the burner in accordance with the temperature conditions created by the refrigerator. The construction thus far described is old, and per se forms no part of the present invention.

In refrigerators, it is necessary from time to time to defrost the cooling unit (not shown) which may take various forms, for example that of an evaporator, expansion coils or a brine tank. After defrosting, it is desirable to effect a return to the temperature normally maintained as soon as possible. The valve 13 obviously would be ineffective for either purpose.

The present invention therefore contemplates the provision of an auxiliary regulator which is adapted to assume primary control of the supply of gas to the burner, and more specifically to cut down the flow of gas to pilot proportions when it is desired to defrost, and to by-pass gas past the valve 13 when it is desired to effect a rapid reduction in temperature. To this end, an auxiliary regulator 14 is interposed between the pipes 11 and 12, and also is connected through a by-pass pipe 15 to the pipe 10 in back of the valve 13.

While in the broadest concept of the invention, the regulator 14 may be of any suitable construction, in its preferred form, it comprises a hollow cylindrical shell or body 16 open at one end and closed at the other end by an integral end wall 17. The interior of the body 16 is formed with a short inner section 18 constituting a gas supply chamber, an elongated threaded intermediate section 19 concentric with and slightly larger in diameter than the section 18 and separated therefrom by an annular shoulder 20, and a short outer section or counter-bore 21 separated from the section 19 by an annular shoulder 22.

The end wall 17 is formed in its inner surface with an axial conical recess 23 constituting a valve seat opening to the chamber 18. Formed in the peripheral wall of the body 16, in longitudinally spaced relation, are three tapped openings 24, 25 and 26 adapted to have threaded therein respectively the connecting ends of the pipes 15, 11 and 12. These openings are spaced angularly about the axis of the body 16 as indicated in Fig. 1.

Adjustably threaded into the intermediate section 19 of the body 16 is an elongated core 27 having an axial stem 28 extending through the bore 21 out of the body. The inner end of the core 27 has a limited movement toward and from the shoulder 20. Secured to the open end of the body 16 and having a central opening 29 about the stem 28 is a mounting plate 30 which also serves as a dial. The plate 30 substantially closes the outer end of the bore 21. Positioned about the stem 28 and against the end of the core 27 and the shoulder 22 is a suitable packing 31. A washer 32 is pressed against the packing 31 by a flat spiral spring 33 which impinges against the inside of the plate 30 and encircles the stem 28. A suitable lever or handle 34, having a diametrically opposed pointer 35 is secured to the stem 28 adjacent the outer surface of the plate 30, and provides means whereby the core 27 can be adjusted.

The core 27 is formed with two longitudinally spaced peripheral grooves 36 and 37 in the same planes respectively as the openings 25 and 26. The groove 36 is always in communication with the opening 25. However, the groove 37 does not completely encircle the core 27, but defines a small cutoff portion 38 adapted to be moved over the opening 26 to close the latter. The core 27 with the stem 28 also is formed with an axial threaded bore 39 opening therethrough and communicating respectively through radial openings 40 and 41 with the grooves 36 and 37. Threaded through the bore 39 is a valve needle or pin 42, the inner end of which is pointed as indicated at 43 and adapted to coact with the valve seat 23, and the outer end of which is provided with two lock nuts 44 adapted to be turned against the end of the stem 28 to secure the needle in position of adjustment in the core 27. The inner half of the needle 42 is formed with an axial passage 45 opening to the valve point 43. Formed in the periphery of the needle 42 and in registration respectively with the openings 40 and 41 are two peripheral grooves 46 and 47 communicating respectively through openings 48 and 49 with the passage 45.

In assembling the parts, the core 27 is adjusted to close the opening or port 26. The needle 42 then is adjusted to provide the desired minimum of gas to the burner. The corresponding position of the pointer 35 is defined by a lug 50 projecting into its path from the dial 30, and is identified as the "Defrost" position on the dial. Rotating the core 27 in the direction of the arrow in Fig. 1 serves first to uncover the port 26 and in all positions to increase the opening of the valve 23—43. The position of the pointer 35 just after the port 26 has been uncovered is identified on the dial as the position for "Normal operation". In operation, when the regulator is adjusted to defrost the refrigerator, gas from the opening 25 passes through the groove 36, the port 40, the groove 46, the port 48, the passage 45, the recess 23, the chamber 18 and the pipe 15 directly to the burner, but is cut-off from the pipe 12. In this position of the core, the thermostatic valve 13 receives no gas and hence exercises no control, and the stream of gas flowing through the pipe 15 is at a minimum, being sufficient only to maintain a pilot flame.

After defrosting, the temperature is high, and hence it is desirable to obtain a more rapid cooling action than is permitted by the thermostatic valve 13. Hence, the needle 35 is turned counter-clockwise beyond the position of normal operation, and if desired to the stop 50, thereby greatly increasing the flow of gas through the pipe 15 directly to the burner. At the same time, the normal amount of gas flows from the opening 25 through the groove 36, the port 40, the groove 46, the port 48, the passage 45, the port 49, the groove 47, the port 41, the groove 37, the opening 26, and the pipe 12 to the thermostatic valve 13. After the temperature has been lowered to the desired point, the needle 32 is moved into the position of normal operation. In this position, not enough gas is supplied to the burner through the pipe 15 to satisfy the refrigerating requirements, and hence the valve 13 assumes automatic control.

It will be evident that I have provided a highly desirable control for gas-fired refrigerators. The control is simple and inexpensive, and provides flexibility in operation.

I claim as my invention:

1. In a gas-fired refrigerator, in combination, a gas supply line, a thermostatically controlled valve in said line for controlling the flow of gas therethrough, an auxiliary regulator interposed in said line in front of said valve, and a by-pass line across said valve, said regulator being adjustable to control said by-pass line and to cut off the supply of gas to said valve.

2. In a gas-fired refrigerator, in combination, a gas supply line, a thermostatically controlled valve in said line for controlling the flow of gas therethrough, an auxiliary regulator interposed in said line in front of said valve, and a by-pass line connecting said regulator to said supply line at a point beyond said valve, said regulator being manually adjustable to vary the flow of gas through said by-pass line and to cut off and on the flow of gas through said supply line to said valve.

3. In a gas-fired refrigerator, in combination, a gas supply line, a regulator in said supply line, said regulator including a valve in said line adapted to be opened and closed, and a by-pass line, said regulator including a valve in said by-pass line which is always open but which is adjustable with said first mentioned valve to vary the flow of gas through said by-pass line to a minimum when said first mentioned valve is closed.

4. A regulator for gas-fired refrigerators comprising, in combination, a shell formed with an inlet port and two outlet ports, and an adjustable member in said shell, said member being formed with passages for connecting said inlet port to said outlet ports, and defining central valves in said passages for reducing or increasing the flow to one outlet port while cutting off or on the flow to the other outlet port.

5. A regulator for gas-fired refrigerators comprising, in combination, a cylindrical shell formed with an inlet port and two outlet ports, a core threaded into said shell and being formed with a gas passage always in communication with said inlet port, a needle valve on said core connecting said passage to one of said outlet ports and being adjustable with said core to vary the flow, means for limiting the adjustment of said core to define a minimum flow past said valve, and a rotary cut off valve on said core for connecting said passage to the other of said outlet ports.

6. A regulator for gas-fired refrigerators comprising, in combination, a cylindrical shell formed with an inlet port and two outlet ports, a core threaded into said shell and being formed with a gas passage always in communication with said inlet port, a needle valve on said core connecting said passage to one of said outlet ports and being adjustable with said core to vary the flow, means for limiting the adjustment of said core to define a minimum flow past said valve, and a rotary cut-off valve on said core for connecting said passage to the other of said outlet ports, said cut-off valve being movable into its closed position as said needle valve is moved into its minimum closed position, and said needle valve being movable to increase the flow therethrough after said cut-off valve is fully open.

7. A regulator for gas-fired refrigerators comprising, in combination, a hollow cylindrical shell threaded internally and formed with two longitudinally spaced outlet ports and one intermediate inlet port, one end of said shell being closed and opening to one of said outlet ports, a rotary core threaded into said shell, said core having an axial passage and two spaced annular grooves in communication with said passage, one of said grooves being constantly in registration with said inlet port and the other of said grooves being rotatable into and out of registration with the other of said outlet ports, said passage being in constant communication with said first mentioned outlet port.

8. A regulator for gas-fired refrigerators comprising, in combination, a hollow cylindrical shell threaded internally and formed with two longitudinally spaced outlet ports and one intermediate inlet port, one end of said shell being closed and opening to one of said outlet ports, a rotary core threaded into said shell, said core having an axial passage and two spaced annular grooves in communication with said passage, one of said grooves being constantly in registration with said inlet port and the other of said grooves being rotatable into and out of registration with the other of said outlet ports, a needle valve adjustably threaded through said passage and being formed with a connecting passage constantly in communication with said grooves, said last mentioned passage opening to the point of said valve, and a coacting valve seat in the closed wall of said shell for controlling the flow from said last mentioned passage to said first mentioned outlet port.

9. For use in a gas-fired refrigerator, the method of supplying gas comprising supplying the gas in two streams, one of which is insufficient during normal operation to satisfy the refrigeration requirements, controlling the other of said streams during normal operation in accordance with refrigeration conditions, reducing said first mentioned stream and cutting off said second mentioned stream for defrosting, increasing said first mentioned stream in excess of its normal size and cutting on said second mentioned stream after defrosting to quickly reduce the temperature to normal, and then reducing said first mentioned stream to normal.

10. In a gas-fired refrigerator, in combination, a gas supply line, means for continuously supplying a stream of gas insufficient to satisfy refrigeration requirements to said line, means automatically operable in accordance with refrigeration requirements for supplying an additional stream of gas to said line, and a regulator for rendering said last mentioned means inoperative at will.

11. In a gas-fired refrigerator, in combination, a gas supply line, means for continuously supplying a stream of gas insufficient to satisfy refrigeration requirements to said line, means automatically operable in accordance with refrigeration requirements for supplying an additional stream of gas to said line, and a regulator for rendering said last mentioned means inoperative at will, and for rendering said last mentioned means operative and actuating said first mentioned means to increase said first mentioned stream at will.

12. In a gas-fired refrigerator, in combination, a gas inlet line, a gas discharge line, a branch line adapted to connect said inlet and discharge lines, means interposed in said branch line, said means being automatically operable in accordance with the refrigeration requirements for controlling the flow of gas through said branch line, a branch by-pass line parallel to said first mentioned branch line and adapted to connect said inlet and discharge lines, and a regulator for controlling the flow of gas from said inlet line to said discharge line through said by-pass line, said regulator in one position of adjustment being operable to restrict the flow of gas to said by-pass line to an amount insufficient to satisfy said requirements and in another position being operable to permit the flow of gas through said by-pass line to exceed said requirements.

JAMES A. WHITTINGTON.